United States Patent [19]

Thomas

[11] 4,247,662

[45] Jan. 27, 1981

[54] NOVEL HALOBISPHENOLETHYLENE POLYCARBONATE-VINYL AROMATIC RESIN BLENDS

[75] Inventor: Douglas P. Thomas, Louisville, Ky.

[73] Assignee: General Electric Company, Schenectady, N.Y.

[21] Appl. No.: 51,766

[22] Filed: Jun. 25, 1979

[51] Int. Cl.³ .................................................. C08L 69/00
[52] U.S. Cl. ....................................... 525/147; 525/67; 525/92; 525/901
[58] Field of Search ................... 525/147, 146, 67, 92, 525/901; 528/196, 198, 202

[56] References Cited

U.S. PATENT DOCUMENTS

| | | | |
|---|---|---|---|
| 3,880,783 | 4/1975 | Serini et al. | 525/146 X |
| 3,933,941 | 1/1976 | Yonemitsu et al. | 525/146 X |
| 4,117,018 | 9/1978 | Cleveland | 528/202 X |

Primary Examiner—Theodore E. Pertilla
Attorney, Agent, or Firm—F. Wesley Turner; James C. Davis, Jr.; Joseph T. Cohen

[57] ABSTRACT

This invention is concerned with a new class of halobisphenolethylene polycarbonate-vinyl aromatic resin blends. More particularly, the invention is concerned with halobisphenolethylene polycarbonate-vinyl aromatic resin blends which exhibit enhanced physical and/or chemical properties. The halobisphenolethylene polycarbonate-vinyl aromatic resin blends are suitable for the manufacture of filaments, fibers, films, sheets, laminates and articles of manufacture including reinforced articles by conventional manufacturing techniques.

11 Claims, No Drawings

NOVEL HALOBISPHENOLETHYLENE POLYCARBONATE-VINYL AROMATIC RESIN BLENDS

CROSS-REFERENCES TO RELATED APPLICATIONS

This invention is related to copending U.S. patent applications which contain subject matter incorporated herein by reference in its entirety, i.e. Ser. No. 052,279 (Kinson) filed June 26, 1979; and Ser. No. 830,860 filed Sept. 6, 1977 (Kinson et al.) a continuation-in-part of Ser. No. 672,415 filed Mar. 31, 1976 now abandoned.

BACKGROUND OF THE INVENTION

1. Field of the Invention

This invention relates to a new class of halobisphenolethylene polycarbonate-vinyl aromatic resin blends.

2. Description of the Prior Art

The prior art has made limited observations regarding the properties of chlorobisphenolethylene polycarbonates such as the infra-red spectroscopic data by Z. Wielgosz, Z. Boranowska and K. Janicka, reported in *Plaste und Kautschuk* 19 (12) 902 (1972). Observations regarding attempts to stabilize chlorobisphenolethylene polycarbonates are reported by Z. Gobiczewski, Z. Wielgosz and K. Janicka in *Plaste und Kautschuk* 16 (2) 99 (1969).

DESCRIPTION OF THE INVENTION

This invention embodies halobisphenolethylene polycarbonate-vinyl aromatic resin blends.

As used herein and in the appended claims, the term "halobisphenolethylene polycarbonate" includes any polycarbonate composition containing within the polycarbonate skeletal backbone "halobis(phenyl)ethylene carbonate" units of the formula:

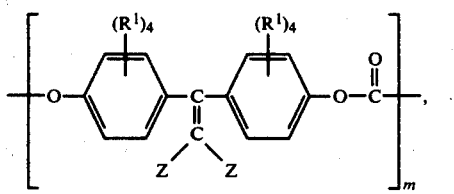

where independently each $R^1$ is hydrogen, chlorine, bromine, or a $C_{1-30}$ monovalent hydrocarbon or hydrocarbonoxy, each Z is hydrogen, chlorine, or bromine, subject to the proviso that at least one Z is chlorine or bromine, and m is an integer of at least 2. Presently preferred monovalent hydrocarbon groups are $C_{1-4}$ alkyl or phenyl. More preferred polycarbonates contain units of formula I, wherein each $R^1$ is hydrogen and each Z is chlorine. Polycarbonates containing only recurring moieties of formula I are halobisphenolethylene homopolycarbonates as defined herein in the appended claims.

Included within the scope of this invention are halobisphenolethylene polycarbonates containing both halobis(phenyl)ethylene carbonate units of formula I as well as "arene carbonate" units of the formula:

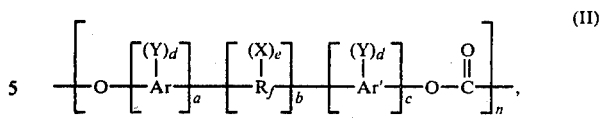

wherein $R_f$ is an alkylene, alkylidene, cycloalkylene, cycloalkylidene or arylene linkage or a mixture thereof, a linkage selected from the group consisting of ether, carbonyl, amine, a sulfur or phosphorus containing linkage, Ar and Ar' are arene radicals, Y is a substituent selected from the group consisting of organic, inorganic and organometallic radicals, X is a monovalent hydrocarbon group selected from the class consisting of alkyl, aryl and cycloalkyl and mixtures thereof, d represents a whole number of at least 0 up to a maximum equivalent to the number of replaceable hydrogens substituted on the aromatic rings comprising Ar or Ar', e represents a whole number of from 0 to a maximum controlled by the number of replaceable hydrogens or $R_f$, a, b and c represent whole numbers including 0, when b is not zero, neither a or c may be zero, otherwise either a or c but not both may be 0, when be is zero, the aromatic groups can be joined by direct carbon bonds and wherein n is an integer of at least 1.

Preferred copolycarbonates included within the scope of this invention are polycarbonates containing both the halobis(phenyl)ethylene carbonate units of formula I as well as arene carbonate units of the formula:

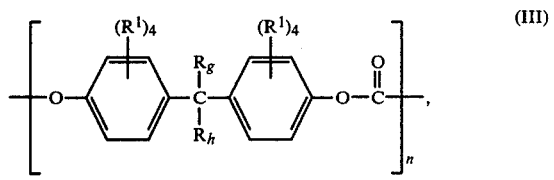

wherein independently each $R^1$ is hydrogen, chlorine, bromine or a $C_{1-30}$ monovalent hydrocarbon group, independently $R_g$ and $R_h$ are hydrogen or a $C_{1-30}$ monovalent hydrocarbon group and n is an integer of at least 2.

Presently preferred monovalent hydrocarbon groups are $C_{1-4}$ alkyl or phenyl. More preferred copolycarbonates contain bisphenyl carbonate units of formula III wherein each $R^1$ is hydrogen and $R_g$ and $R_h$ are methyl.

Halobisphenolethylene polycarbonates can be prepared by methods known to those skilled in the art such as those described by S. Porejko et al., Polish Pat. No. 48,893, issued Dec. 12, 1964, entitled *Process for Synthesizing Self-Extinguishing Thermoplastics* and Z. Wielgosz et al., Polimery 17, 76 (1972). In general, the S. Porejko et al. and Z. Wielgosz et al. methods describe reactions of a chlorobisphenolethylene, i.e. 1,1-dichloro-2,2-bis(4-hydroxyphenyl)ethylene and bisphenol-A, i.e. bis(4-hydroxyphenyl)propane-2,2 mixture with a carbonate precursor, e.g. phosgene and an acid acceptor, e.g. caustic soda and a catalyst, e.g. triethylamine, wherein the reactions are carried out under conventional phosgenating reaction conditions, i.e. reaction conditions generally associated with the phosgenation of bisphenol-A as described in the Encyclopedia of Polymer Science and Technology 10 entitled *Polycarbonates*, pages 710–764, Interscience Publishers (1969).

Illustrative of some halobisphenolethylenes that can be employed in the preparation of homo- and co-polycarbonates in accordance with the phosgenating reaction conditions described by S. Porejko et al. and Z. Wielgosz et al. as well as those described in the Encyclopedia of Polymer Science follow:

1,1-dibromo-2,2-bis(4-hydroxyphenyl)ethylene;
1,1-dichloro-2,2-bis(5-methyl-4-hydroxyphenyl)ethylene;
1,1-dibromo-2,2-bis(3,6-n-butyl-4-hydroxyphenyl)ethylene;
1,1-dichloro-2,2-bis(2-chloro-5-ethyl-4-hydroxyphenyl)ethylene;
1,1-dibromo-2,2-bis(2,5-dibromo-4-hydroxyphenyl)ethylene;
1-bromo-2,2-bis(4-hydroxyphenyl)ethylene;
1-chloro-2,2-bis(3,5-di-isopropyl-4-hydroxyphenyl)ethylene;
1-bromo-2,2-bis(2,6-di-t-butyl-4-hydroxyphenyl)ethylene;
1-chloro-2,2-bis(2,6-dichloro-4-hydroxyphenyl)ethylene;
1-bromo-2,2-bis(2,3-dibromo-4-hydroxyphenyl)ethylene;
1,1-dichloro-2,2-bis(3,5-dichloro-4-hydroxyphenyl)ethylene;
1,1-dichloro-2,2-bis(3,5-dibromo-4-hydroxyphenyl)ethylene;
1,1-dibromo-2,2-bis(5-chloro-4-hydroxy)ethylene;
1-chloro-2,2-bis(3,6-dibromo-4-hydroxyphenyl)ethylene;
1-bromo-2,2-bis(2-chloro-4-hydroxyphenyl)ethylene;
1,1-dichloro-2,2-bis(2,3,5-trichloro-4-hydroxyphenyl)ethylene;
1,1-dibromo-2,2-bis(2,3,5,6-tetrabromo-4-hydroxyphenyl)ethylene;
1-chloro-2,2-bis(3-phenyl-4-hydroxyphenyl)ethylene;
1-bromo-2,2-bis(3,5-diphenyl-4-hydroxyphenyl)ethylene;
1,1-dichloro-2,2-bis(2,6-diphenyl-4-hydroxyphenyl)ethylene;
1,1-dibromo-2,2-bis(3-bromo-5-phenyl-4-hydroxyphenyl)ethylene;
1-chloro-2,2-bis(3-methoxy-4-hydroxyphenyl)ethylene;
1-bromo-2,2-bis(3,5-dimethoxy-4-hydroxyphenyl)ethylene;
1,1-dichloro-2,2-bis(2-ethoxy-4-hydroxyphenyl)ethylene;
1,1-dibromo-2,2-bis(2,6-diethoxy-4-hydroxyphenyl)ethylene;
1-chloro-2,2-bis(5-phenylether-4-hydroxyphenyl)ethylene;
1-bromo-2,2-bis(3,5-diphenylether-4-hydroxyphenyl)ethylene;
1,1-dichloro-2,2-bis(3-chloro-5-phenylether-4-hydroxyphenyl)ethylene;
1,1-dibromo-2,2-bis(2-bromo-5-phenylether-4-hydroxyphenyl)ethylene; etc.,
among many others.

Illustrative of some arene dihydroxy compounds that can be employed in the preparation of halobisphenolethylene copolycarbonates or in the preparation of other polycarbonates that contain arene carbonate units of formulas II and III—other polycarbonates that can be combined with the halobisphenolethylene polycarbonate-vinyl aromatic resin blends of this invention—follow:

resorcinol;
4,4'-dihydroxy-diphenyl;
1,6-dihydroxy-naphthalene;
2,6-dihydroxy-naphthalene;
4,4'-dihydroxy-diphenyl methane;
4,4'-dihydroxy-1,1-ethane;
4,4'-dihydroxy-diphenyl-1,1-butane;
4,4'-dihydroxy-diphenyl-1,1-isobutane;
4,4'-dihydroxy-diphenyl-1,1-cyclopentane;
4,4'-dihydroxy-diphenyl-1,1-cyclohexane;
4,4'-dihydroxy-diphenyl-phenyl methane;
4,4'-dihydroxy-diphenyl-2-chlorophenyl methane;
4,4'-dihydroxy-diphenyl-2,4-dichlorophenyl methane;
4,4'-dihydroxy-diphenyl-p-isopropylphenyl methane;
4,4'-dihydroxy-diphenylnaphthyl methane;
4,4'-dihydroxy-diphenyl-2,2-propane;
4,4'-dihydroxy-3-methyl-diphenyl-2,2-propane;
4,4'-dihydroxy-3-cyclohexyl-diphenyl-2,2-propane;
4,4'-dihydroxy-3-methoxy-diphenyl-2,2-propane;
4,4'-dihydroxy-3-isopropyl-diphenyl-2,2-propane;
4,4'-dihydroxy-3,3'-dimethyl-diphenyl-2,2-propane;
4,4'-dihydroxy-3,3'-dichloro-diphenyl-2,2-propane;
4,4'-dihydroxy-diphenyl-2,2-butane;
4,4'-dihydroxy-diphenyl-2,2-pentane;
4,4'-dihydroxy-diphenyl-2,2(4-methyl pentane);
4,4'-dihydroxy-diphenyl-2,2-n-hexane;
4,4'-dihydroxy-diphenyl-2,2-nonane;
'4,4'-dihydroxy-diphenyl-4,4-heptane;
4,4'-dihydroxy-diphenyl phenylmethyl methane;
4,4'-dihydroxy-diphenyl-4-chlorophenylmethyl methane;
4,4'-dihydroxy-diphenyl-2,5-dichlorophenylmethyl methane;
4,4'-dihydroxy-diphenyl-3,4-dichlorophenylmethyl methane;
4,4'-dihydroxy-diphenyl-4-fluorophenylmethyl methane;
4,4'-dihydroxy-diphenyl-2-naphthylmethyl methane;
4,4'-dihydroxy-tetraphenyl methane;
4,4'-dihydroxy-diphenyl phenylcyano methane;
4,4'-dihydroxy-diphenyl-1,2-ethane;
4,4'-dihydroxy-diphenyl-1,10-n-decane;
4,4'-dihydroxy-diphenyl-1,6(1,6-dioxo-n-hexane);
4,4'-dihydroxy-diphenyl-1,10(1,10-dioxo-n-decane);
bis-p-hydroxy-phenylether-4,4'-diphenyl;
α,α,α',α'-tetramethyl-α,α'-(di-p-hydroxyphenyl)-p-xylylene;
α,α,α',α'-tetramethyl-α,α'-(di-p-hydroxyphenyl)-m-xylylene;
2,2'-dihydroxy-3,3',5,5'-tetramethyldiphenyl methane;
4,4'-dihydroxy-3,3'-dimethyl-diphenyl methane;
4,4'-dihydroxy-2,2'-dimethyl-diphenyl methane;
4,4'-dihydroxy-3,3',5,5'-tetramethyl-diphenyl methane;
4,4'-dihydroxy-3,3'-dichloro-diphenyl methane;
4,4'-dihydroxy-3,3'-dimethoxy-diphenyl methane;
4,4'-dihydroxy-2,2',5,5'-tetramethyl-diphenyl methane;
4,4'-dihydroxy-2,2',3,3',5,5',6,6'-octamethyl-diphenyl methane;
4,4'-dihydroxy-2,2'-dimethyl-5,5'-diisopropyl-diphenyl methane;
4,4'-dihydroxy-2,2'-dimethyl-5,5'-dipropyl-diphenyl methane;
4,4'-dihydroxy-2,2'-dimethyl-5,5'-di-tert.-butyl-diphenyl methane;
4,4'-dihydroxy-diphenyl-5,5-nonane;
4,4'-dihydroxy-diphenyl-6,6-undecane;
4,4'-dihydroxy-diphenyl-3,3-butanone-2;
4,4'-dihydroxy-3,3'-dimethyl-diphenyl-3,3-butanone-2;
4,4'-dihydroxy-diphenyl-4,4-hexanone-3;

4,4'-dihydroxy-diphenylmethyl-4-methoxy-phenyl methane;
4,4'-dihydroxy-diphenyl ether;
4,4'-dihydroxy-diphenyl sulfide;
4,4'-dihydroxy-3,3'-dimethyldiphenyl sulfide;
4,4'-dihydroxy-diphenyl sulfoxide;
4,4'-dihydroxy-diphenyl sulfone;
4,4'-dihydroxy-3,3'-dichlorodiphenyl sulfone;
4,4'-dihydroxy-3,3',5,5'-tetramethyl-diphenyl methane;
4,4'-dihydroxy-3,3',5,5'-tetrachloro-diphenyl-1,1-cyclohexane;
4,4'-dihydroxy-3,3',5,5'-tetrachloro-diphenyl-2,2-propane;
4,4'-dihydroxy-3,3',5,5'-tetramethyl-2,2',6,6'-tetrabromo-diphenyl-2,2-propane; and
4,4'-dihydroxy-3,3',5,5'-tetrabromo-diphenyl-2,2-propane, etc., among many others.

Presently preferred halobisphenolethylene polycarbonates exhibit an intrinsic viscosity of at least 0.3 and more preferably about 0.5 deciliters per gram (dl./g.) as measured in either methylene chloride or chloroform or similar solvent systems at 25° C. The upper intrinsic viscosity number is not critical, however, it will generally be about 1.5 dl./g. Especially useful halobisphenolethylene polycarbonates generally have an intrinsic viscosity within the range of from about 0.38 to about 0.7 dl./g. Preferably, the halobisphenolethylene polycarbonates contain a sufficient number of repeating units of formulas I, or I and II or III, set out hereinbefore, to give a number average molecular weight of homo- or copolycarbonates—including blends thereof with other polycarbonates—of at least about 5,000, and more preferably a number average molecular weight of from about 10,000 to about 50,000. Polycarbonates of such molecular weight characteristics process easily inbetween about 450° F. and 650° F.

As used herein and in the appended claims, the term "vinyl aromatic resin" includes any "styrenic" polymers derived from compounds having—at least a portion of and, preferably at least 25% of—their units derived from a monomer having the formula:

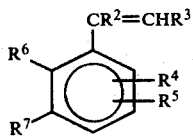

(IV)

wherein $R^2$ and $R^3$ are selected from the group consisting of lower alkyl or alkenyl groups of from 1 to 6 carbon atoms and hydrogen; $R^4$ and $R^5$ are selected from the group consisting of chloro, bromo, hydrogen and lower alkyl of from 1 to 6 carbon atoms; $R^6$ and $R^7$ are selected from the group consisting of hydrogen and lower alkyl and alkenyl groups of from 1 to 6 carbons or $R^6$ and $R^7$ may be concatenated together with hydrocarbyl groups to form a naphthyl group.

Included in the scope of this invention are copolymers of the aromatic monomer of formula IV and those having their units derived from "olefinic" monomers having the formula:

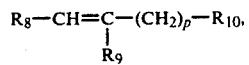

(V)

wherein $R_8$ and $R_9$ represent a substituent selected from the group consisting of hydrogen, halogen, an alkyl group of 1–4 carbon atoms, carboalkoxy or $R_8$ and $R_9$ taken together represent an anhydride linkage (—COOOC—) and $R_{10}$ is hydrogen, vinyl, an alkyl or alkenyl group having 1 to 12 carbon atoms, cycloalkyl, carboalkoxy, alkoxy-alkyl, alkyl carboxy, ketoxy, halogen, carboxy, cyano or pyridyl and p is a whole number between 0 and 9.

The general expression vinyl aromatic resin set forth herein includes, by way of example, homopolymers such as polystyrene and polymonochlorostyrene, etc., the modified polystyrenes, such as rubber-modified, high-impact polystyrene, etc., the styrene containing copolymers, such as the styrene acrylonitrile copolymers, styrene butadiene copolymers, styrene-acrylonitrile-α-alkyl styrene copolymers, styrene-acrylonitrile-butadiene copolymers, poly-α-methylstyrene, copolymers of ethylvinyl benzene, copolymers of α,β-unsaturated cyclic anhydrides including maleic anhydride, citraconic anhydride, itaconic anhydride, acotinic anhydride with styrene such as styrene-maleic anhydride copolymers, etc., graft copolymers of styrene and styrene-butadiene, etc., divinylbenzene styrene-maleic anhydride copolymers, block copolymers of polystyrene-polybutadiene, polystyrene-polybutadiene-polystyrene, polystyrene-polyisoprene-polystyrene, etc., hydrogenated block copolymers of polystyrene-polybutadiene-polystyrene, etc., radical teleblock copolymers of butadiene and styrene including minor amounts of a coupling agent, hydrogenated radical teleblock copolymers, impact modified teleblock copolymers such as acrylic-styrene-butadiene terepolymer, modified teleblock polymers, etc.

The rubber modified high impact polystyrenes may be made with diene rubbers such as butadiene rubber, styrene-butadiene rubber, acylonitrile rubber or ethylene-propylene copolymers or EPDM rubber.

Blends of halobisphenolethylene polycarbonates and vinyl aromatic resins, as described hereinbefore, can be prepared by any means known to those skilled in the art. Preferred blends are prepared by heating admixtures of a halobisphenolethylene polycarbonates and vinyl aromatic resins to a temperature above their softening point(s). Preferably, the mixing or blending is carried out—when carried out in the absence of a solvent—at the aforesaid elevated temperature, i.e. above their softening point(s), while subjecting the admixture to mechanical working. Accordingly, blends can be mixed with such equipment as extruders including mono- and multiple screw types, internal Banbury mixers, roll mills, or any other mechanical equipment which will subject the admixture to shear stresses at elevated temperatures.

In general, the halobisphenolethylene polycarbonatevinyl aromatic resin compositions of this invention can contain other ingredients such as reinforcing and nonreinforcing fillers, mold release agents, ultraviolet light stabilizers, antioxidants, drip retarding agents, surfactant agents, etc.

The halobisphenolethylene polycarbonates and vinyl aromatic resins are combinable with each other in all proportions. Consequently, compositions comprising from 1 to 99%, by weight, halobisphenolethylene polycarbonate and from 99 to 1%, by weight, vinyl aromatic resin are included within the scope of the invention. By controlling the proportions of halobisphenolethylene polycarbonate and vinyl aromatic resin formulations having predetermined properties which are improved over those of either a halobisphenolethylene polycarbonate or a vinyl aromatic resin alone are readily obtained. In general, blends of halobisphenolethylene polycarbonate and vinyl aromatic resin have substantially enhanced flame retardancy values wherein nominal amounts 1 to 50%, by weight, of vinyl aromatic resins are combined with 99 to 50%, by weight, of halobisphenolethylene polycarbonates, while still retaining or improving substantially the physical and chemical polymer property profile associated with the vinyl aromatic resin component of the blends.

The following examples illustrate—but do not limit—the best method of practicing the invention. Unless otherwise indicated in the examples, the following general procedures were employed in the preparation and testing of the halobisphenolethylene polycarbonate-vinyl aromatic resin blends. Deviations from the general procedure are noted in the specific examples.

GENERAL PROCEDURE

A series of blends of chlorobisphenolethylene polycarbonates and vinyl aromatic resins were prepared from non-commercially available material and commercially available materials, respectively. The chlorobisphenol polycarbonate (abbreviated in the examples as bisphenol-E polycarbonate) was prepared by the reaction of an aqueous alkaline solution of 1,1-dichloro-2,2-bis(4-hydroxyphenyl)ethylene (prepared as described hereafter) with phosgene carried out in the presence of triethylamine and methylene chloride at a temperature range of from about 20° to about 40° C. to form high molecular weight chlorobisphenolethylene polycarbonates having an intrinsic viscosity as measured in methylene chloride at a temperature of 25.3° C. within the range of from about 0.41 to 0.54.

The 1,1-dichloro-2,2-bis(4-hydroxyphenyl)ethylene employed was prepared in accordance with the following detailed description: Under nitrogen, methanol (16.2 liters) was charged to a 10 gallon stainless steel reactor. Flake KOH (4098 gm., 85% solids, 62.1 moles) was added over 20 minutes with cooling to keep the temperature below 45° C. After cooling to 17° C., 1,1,1-trichloro-2,2-bis(4-hydroxyphenylethane) (3804 gm., 12 moles) was added as a powder. The stirred reaction mixture was then held at 27°-30° C. for 5 days (resulting in a starting material level of 3%) and then heated to reflux (75° C.) for two hours to lower the starting material level to several hundred ppm. After cooling to 25° C. the material was transferred under nitrogen to two 22 liter glass flasks and acidified to a pH of 5 with concentrated HCl (4320 ml.). The material was then split into two equal halves. One of the halfs was then heated to near reflux and 7.5 liters of water at 75° C. was added. The resulting mixture was cooled to 25° C. over 3 hours and the resulting reaction product crystals were collected in a basket centrifuge and washed with 12 liters of water to dissolve and remove KCl which had also crystallized from the mother-liquor. The resulting product was redissolved in 4 liters of methanol, filtered through a 0.2 micron millipore filter, heated to 75° C. and 4 liters of hot water were added. After cooling, the crystals were collected in a basket centrifuge, washed with 4 liters of water, and dried in a vacuum oven at 100° C. to afford 150 gm., an 89% yield of product, i.e. 1,1-dichloro-2,2-bis(4-hydroxyphenyl)ethylene. Liquid chromatography analysis indicated less than 150 ppm. starting material. Product nitrogen content was less than 5 ppm. and iron was less than 0.5 ppm.

The resulting bisphenol-E polycarbonate and vinyl aromatic resins were powder blended into a series of compositions, extruded and chopped into pellets. The pelleted materials were injection or compression molded and tested accordingly:

Notched Izod Impact ($\frac{1}{8}$" specimens, ft.-lbs. per inch of notch) ASTM D256 method A;
Oxygen Index ASTM D2863;
Tensile Yield Stress (psi) ASTM D1822; L specimen, 0.05"/min.;
Flexural Strength (psi) ASTM D790.

EXAMPLES 1-3

Bisphenol-E polycarbonate and high impact polystyrene, a commercial product of Cosden Oil and Chemical Company, were blended and tested in accord with the description of the General Procedure. The results of the tests are tabulated in Table I set out hereafter.

TABLE I

| Composition and Mechanical Properties of Bisphenol-E and High Impact Polystyrene | | | |
|---|---|---|---|
| Example No. | 1 | 2 | 3 |
| I. Blend Composition | | | |
| (a) bisphenol-E, phr[1] | 0 | 25 | 25 |
| (b) high impact polystyrene[2], phr | 100 | 100 | 100 |
| (c) $Sb_2O_3$, phr | 0 | 0 | 7 |
| II. Physical Properties | | | |
| (a) notched Izod impact | 1.82 | 0.52 | 0.72 |
| (b) oxygen index | 18.30 | 19.42 | 21.57 |
| (c) flexural strength, psi | 8,636 | 10,202 | 10,076 |
| (d) flexural modulus ($10^5$ psi) | 3.59 | 4.00 | 3.86 |

[1]phr = parts per hundred of polycarbonate resin
[2]Cosden Type 825 TV (unlubricated beads)

EXAMPLES 4-9

Bisphenol-E polycarbonate and an acrylonitrile-butadiene-strene polymer, a commercial product of Dart Industries, Inc., were blended and tested in accord with the description of the General Procedure. The results of the tests are tabulated in Table II set out hereafter.

TABLE II

| Composition and Mechanical Properties of Bisphenol-E and Acrylonitrile:Butadiene-Styrene | | | | | | |
|---|---|---|---|---|---|---|
| Example No. | 4 | 5 | 6 | 7 | 8 | 9 |
| I. Blend Composition | | | | | | |
| (a) bisphenol-E, phr[1] | 0 | 25 | 50 | 75 | 90 | 100 |
| (b) acrylonitrile-butadiene-styrene[2], phr | 100 | 75 | 50 | 25 | 10 | 0 |
| II. Physical Properties | | | | | | |
| (a) notched Izod impact | 5.8 | 2.6 | 14.9 | 13.0 | 14.8 | 16.0 |
| (b) oxygen index | 18.3 | 20.8 | 22.4 | 35.7 | 48.7 | 54.8 |
| (c) tensile yield stress | 6010 | 6830 | 7980 | 8960 | 9730 | 10,040 |

TABLE II-continued

| Composition and Mechanical Properties of Bisphenol-E and Acrylonitrile:Butadiene-Styrene | | | | | | |
|---|---|---|---|---|---|---|
| Example No. | 4 | 5 | 6 | 7 | 8 | 9 |
| (d) flexural strength | 8850 | 10,680 | 12,830 | 14,480 | 15,510 | 16,340 |

[1] phr = parts per hundred of polycarbonate resin
[2] Dart Industries - ABS Type Rexene(R) 410 ESC Natural

EXAMPLES 10-12

Bisphenol-E polycarbonate and a styrene-maleic anhydride copolymer, a commercial product of ARCO Polymers, Inc., were blended and tested in accord with the description of the General Procedure. The results of the tests are tabulated in Table III set out hereafter.

TABLE III

| Composition and Mechanical Properties of Bisphenol-E and Styrene-Maleic Anhydride Copolymers | | | |
|---|---|---|---|
| Example No. | 10 | 11 | 12 |
| I. Blend Composition | | | |
| (a) bisphenol-E, phr[1] | 0 | 50 | 100 |
| (b) styrene-maleic anhydride copolymer[2] phr | 100 | 50 | 0 |
| II. Physical Properties | | | |
| (a) notched Izod impact | 0.54 | 0.55 | 1.6 |
| (b) oxygen index | 23.2 | 30.8 | 54.8 |
| (c) tensile yield stress | 6396 | | 10,040 |
| (d) flexural strength | 8540 | 11,670 | 16,340 |

[1] phr = parts per hundred of polycarbonate resin
[2] ARCO Polymers, Inc. - Dylark(TM) 240

The halobisphenolethylene polycarbonate-vinyl aromatic resin blends are suitable for the manufacture of filaments, fibers, films, sheets, laminates and articles of manufacture including reinforced articles by conventional manufacturing techniques.

It will be apparent to those skilled in the art that other changes and modifications can be made in the particular embodiments of the invention described herein and said modifications and embodiments are within the full intended scope of the invention as defined by the appended claims.

I claim:

1. A polymer blend comprising:
   (I) about 1-99 parts by weight of a polycarbonate containing halobis(phenyl)ethylene carbonate units of formula (A):

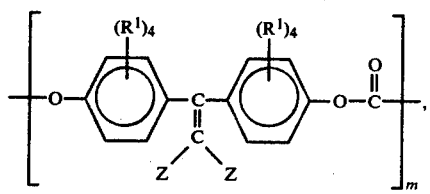

where independently each $R^1$ is hydrogen, chlorine, bromine or a $C_{1-30}$ monovalent hydrocarbon or hydrocarbonoxy group, each Z is hydrogen, chlorine or bromine, subject to the proviso that at least one Z is chlorine or bromine, and m is an integer of at least 2, and (II) about 99-1 parts by weight of a vinyl aromatic resin.

2. A claim 1 composition, wherein (I) the polycarbonate units are of the formula:

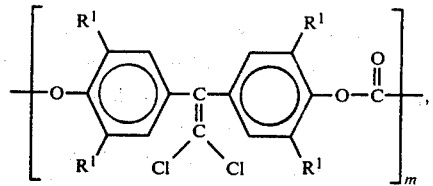

where independently each $R^1$ is hydrogen, chlorine, bromine, $C_{1-4}$ alkyl or phenyl and m is an integer of at least 2.

3. The claim 2 composition, wherein (I) the polycarbonate unit $R^1$ substituents are hydrogen.

4. The claim 1 composition, wherein (I) the polycarbonate unit $R^1$ substituents are hydrogen, at least one Z substituent is chlorine and the other Z substituent is hydrogen.

5. The claim 1 composition, wherein the polycarbonate of (I) contains (a) about 1-100 parts by weight of halobis(phenol)ethylene polycarbonate units for formula (A):

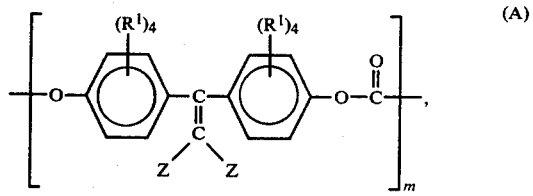

where independently each $R^1$ and Z are as defined hereinbefore, to (b) about 99-0 parts by weight of arene carbonate units of formula (B):

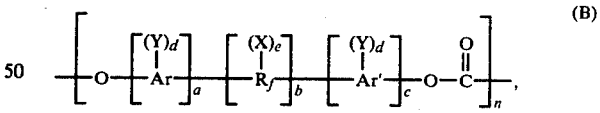

wherein $R_f$ is an alkylene, alkylidene, cycloalkylene, cycloalkylidene or arylene linkage or a mixture thereof, a linkage selected from the group consisting of ether, carbonyl, amine, a sulfur or phosphorus containing linkage, Ar and Ar' are arene radicals, Y is a substituent selected from the group consisting of organic, inorganic and organometallic radicals, X is a monovalent hydrocarbon group selected from the class consisting of alkyl, aryl and cycloalkyl and mixtures thereof, a halogen, an ether group of the formula-OE, wherein E is a monovalent hydrocarbon radical similar to X, a monovalent hydrocarbon group of the type represented by $R_f$, d represents a whole number of at least 1, c represents a whole number equal to at least 0 or more, a, b and c represent whole numbers including 0, a or c but not both may be 0, and wherein n is an integer of at least 2.

6. The claim 1 composition, wherein (II) the vinyl aromatic resin is derived from a styrenic monomer of the formula (C):

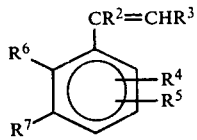 (C)

wherein $R^2$ and $R^3$ are selected from the group consisting of lower alkyl or alkenyl groups of from 1 to 6 carbon atoms and hydrogen; $R^4$ and $R^5$ are selected from the group consisting of chloro, bromo, hydrogen and lower alkyl of from 1 to 6 carbon atoms; $R^6$ and $R^7$ are selected from the group consisting of hydrogen and lower alkyl and alkenyl groups of from 1 to 6 carbons or $R^6$ and $R^7$ may be concatenated together with hydrocarbyl groups to form a naphthyl group.

7. The claim 6 composition wherein (II) the vinyl aromatic resin is derived from a monomer of the formula (C) as defined hereinbefore and an olefinic monomer of the formula (D):

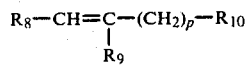

wherein $R_8$ and $R_9$ represent a substituent selected from the group consisting of hydrogen, halogen, an alkyl group of 1–4 carbon atoms, carboalkoxy or $R_8$ and $R_9$ taken together represent an anhydride linkage (—COOOC—) and $R_{10}$ is hydrogen, vinyl, an alkyl or alkenyl group having 1 to 12 carbon atoms, cycloalkyl, carboalkoxy, alkoxy-alkyl, alkyl carboxy, ketoxy, halogen, carboxy, cyano or pyridyl and p is a whole number between 0 and 9.

8. The claim 7 composition wherein at least 25% by weight of the vinyl aromatic resin is derived from the styrenic monomer.

9. The claim 2 composition wherein such R is hydrogen and the vinyl aromatic resin is a high impact polystyrene.

10. The claim 2 composition, wherein each R is hydrogen and the vinyl aromatic resin is an acrylonitrile-butadiene-styrene resin.

11. The claim 2 composition, wherein each R is hydrogen and the vinyl aromatic resin is a styrene-maleic anhydride copolymer.

* * * * *